April 16, 1968 P. J. GOOD 3,378,132
FEED MECHANISM FOR DIE CUTTER
Filed Nov. 16, 1966 2 Sheets-Sheet 1
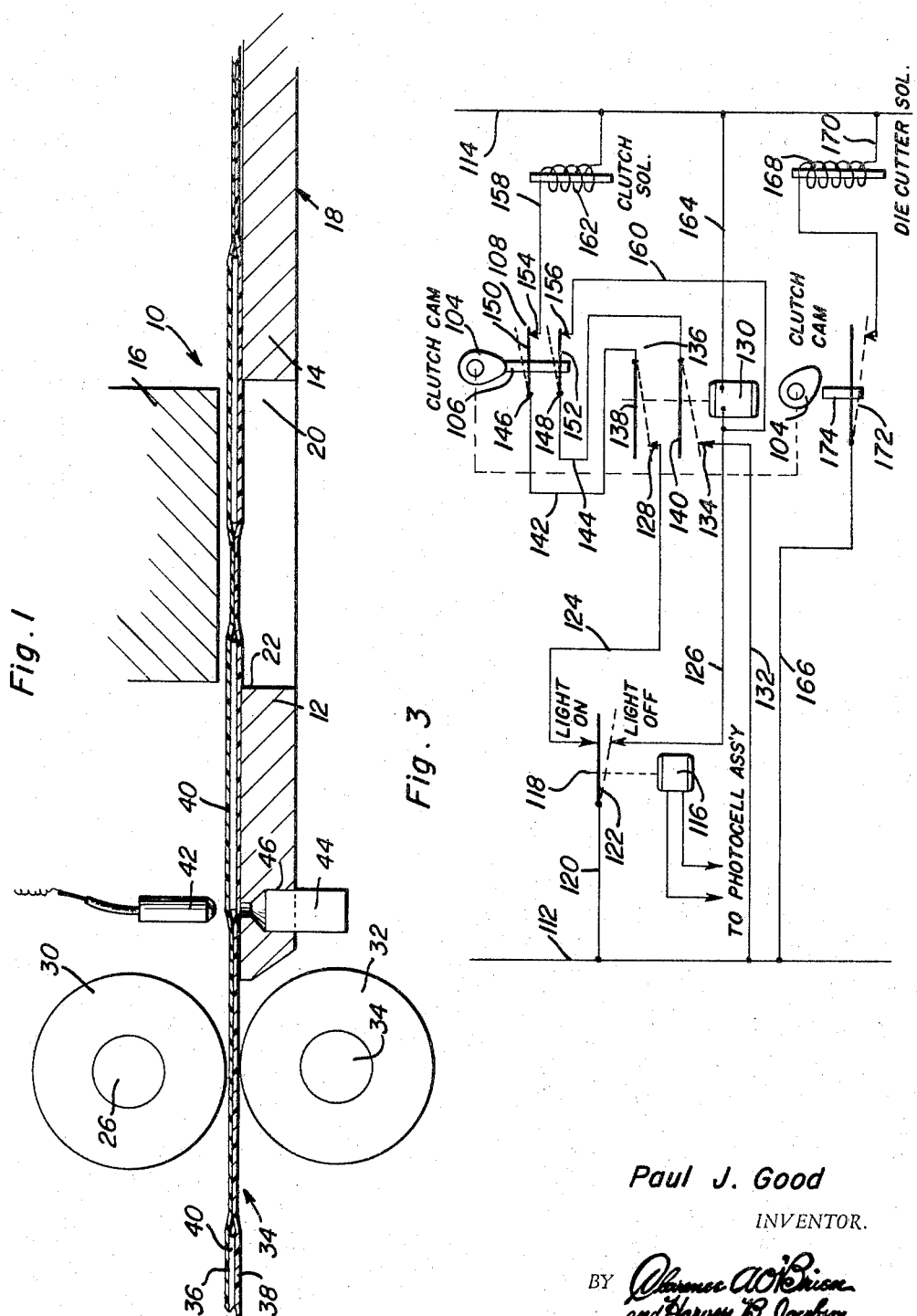
Paul J. Good
INVENTOR.

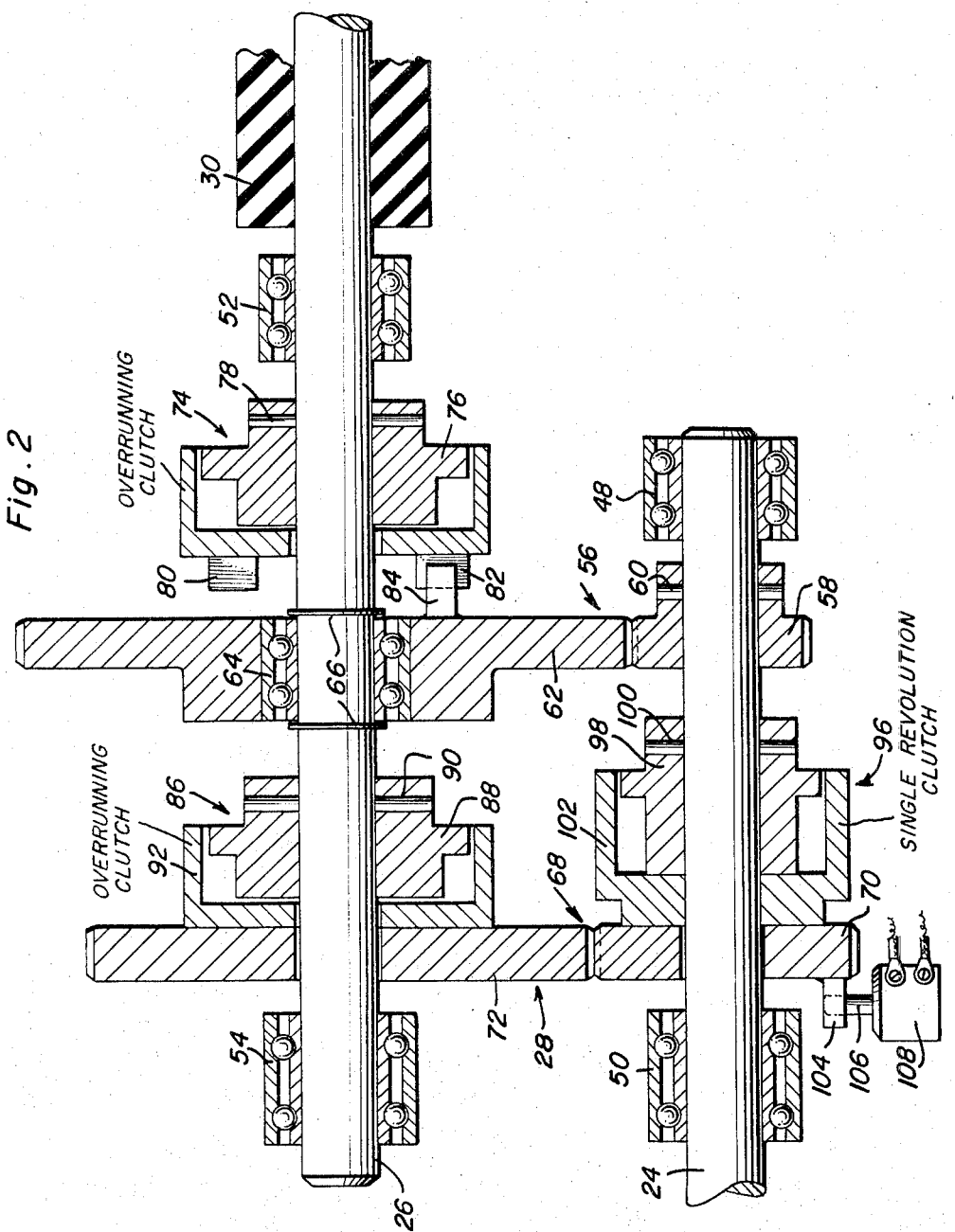

United States Patent Office 3,378,132
Patented Apr. 16, 1968

3,378,132
FEED MECHANISM FOR DIE CUTTER
Paul J. Good, Springwater, N.Y., assignor to D-S Industries, Inc., a corporation of New York
Filed Nov. 16, 1966, Ser. No. 594,772
9 Claims. (Cl. 198—135)

ABSTRACT OF THE DISCLOSURE

An intermittent drive feed mechanism including an input member and an output member and provided with transmission means drivingly connecting the input member to the output member through two separate selectively usable power transmission paths, the transmission means including selectively actuatable power transmission shift means operative, when actuated, to shift the path of transmission of power from a first path of transmission to the second path of transmission for a predetermined period and then automatically shift the path of transmission of power back to the first path.

---

This invention relates to a novel and useful feed mechanism for a die cutter and more specifically to a feed mechanism adapted to intermittently advance an elongated panel which is to have indeterminate length sections thereof cut therefrom by means of a die cutter or the like.

The feed mechanism of the instant invention is illustrated and described hereinafter as a means for advancing elongated strips of transparent plastic between which various materials have been laminated. The feed mechanism is particularly well adapted to feed these strips of plastic material into a die cutter in that the feed mechanism includes means whereby the strips being advanced may be intermittently stopped in desired positions of advancement for cutting by the associated die cutter.

In the instant application, the strips of transparent plastic have laminated therebetween panel-like articles such as cards which are at least substantially impervious to light and the feed mechanism includes photoelectric cell actuating means operable to intermittently actuate a portion of the feed mechanism which is operable to interrupt the advancement of the plastic strips for a predetermined time during which the associated die cutter is actuated prior to the feed mechanism again resuming feed of the plastic strips toward the die cutter. In this manner, the cards laminated between the plastic strips may be spaced different distances apart and may be of any length in the direction of movement of the plastic strips as will be hereinafter more fully apparent.

The main object of this invention is to provide a feed mechanism that will be operable to feed various types of materials along a predetermined path and intermittently interrupt the feed of the associated materials upon an actuating signal rendered by the material being fed.

Still another object of this invention is to provide a feed mechanism in accordance with the preceding objects and which will be completely automatic in operation.

A further object of this invention is to provide a feed mechanism which will be readily adaptable to being utilized in different environments.

A final object of this invention to be specifically enumerated herein is to provide a feed mechanism in accordance with the preceding objects and which will conform to conventional forms of manufacture, be of simple construction and automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatical view of the driving rollers of the feed mechanism positioned adjacent an associated die cutter, the latter being fragmentarily illustrated in vertical section, and with the photoelectric cell mechanism operatively positioned relative to the feed rollers and die cutter so as to actuate the drive mechanism in a manner such that the laminated structure being advanced may be momentarily halted and cut by the die cutter;

FIGURE 2 is a diagrammatical sectional view of the gearing and clutch assemblies of the drive mechanism; and FIGURE 3 is a diagrammatical view of the electrical actuating circuitry of the feed mechanism.

Referring now more specifically to the drawings, the numeral 10 generally designates a die cutter of conventional design including a pair of stationary cutting members 12 and 14 and a vertically reciprocal and solenoid actuated cutter member 16. The cutter members 12 and 14 actually comprise opposing portions of a single cutter member generally referred to by the reference numeral 18 and having an opening 20 formed therein into which the cutter member 16 may be advanced by means of its solenoid actuated driving means (not shown). However, if it is desired, the cutter member 12 could comprise a single cutter member extending transversely of the path of advancement of the material to be cut and all portions of the cutter member 18 disposed to the right of the cutting edge 22 of the cutter member 12 could be eliminated for a purpose to be hereinafter more fully set forth.

With attention now invited more specifically to FIGURES 1 and 2 of the drawings, there may be seen a drive shaft 24 which may be rotated by any suitable power source and which drives a driven shaft 26 through a drive assembly generally referred to by the reference numeral 28, the driven shaft 26 having a resilient roller 30 mounted thereon and an idler roller 32 being mounted on an idler shaft 34 adjacent the roller 30.

The material to be advanced toward the opening 20 is generally designated by the reference numeral 35 and includes a pair of upper and lower elongated strips 36 and 38 constructed of transparent plastic and having a plurality of card-like members 40 laminated therebetween, the card-like members 40 being spaced longitudinally along the strips 36 and 38.

The card-like members 40 are constructed of material which is substantially impervious to light and a suitable light source 42 is supported above the approach portion of the cutter member 12 and a light detecting mechanism in the form of a photoelectric cell assembly 44 is secured in an opening 46 provided therefor through the cutter member 12 and in position to detect light shining downward from the light source 42.

The material 35 passes between the rollers 30 and 32 in frictional contact therewith and is therefore driven toward the opening 20 into which the cutter member 16 is receivable.

The shaft 24 is journaled from suitably located bearings 48 and 50 while the shaft 26 is journaled from suitably located bearings 52 and 54. The drive assembly 28 includes a first numerically high drive connection generally referred to by the reference numeral 56 between the shafts 24 and 26. The drive connection 56 includes a first drive gear 58 mounted on the shaft 24 by a pin 60 meshed with a driven gear 62 journaled on the shaft 26 by means of a bearing assembly 64 and held against axial displacement longitudinally of the shaft 26 by means of snap rings 66. The drive assembly also includes a second drive connection generally referred to by the reference numeral 68 and which includes a drive gear 70 on the shaft 24 meshed with a driven gear 72 disposed on the shaft 26.

The first drive connection includes a first overrunning clutch generally referred to by the reference numeral 74 having a first section 76 pinned to the shaft 26 as at 78 and a second section provided with diametrically opposite stop flanges 80 and 82 which are each engageable by an abutment flange 84 carried by the confronting face of the driven gear 62.

In addition, the drive connection 56 includes an overrunning clutch generally referred to by the reference numeral 86 which is substantially identical to the clutch 74 and has its first section 88 pinned to the shaft 26 as at 90 and its second section 92 secured to the confronting face of the driven gear 72. The overrunning clutches may be of any suitable type such as two #1½-1-1CL clutches manufactured by the Hilliard Corporation, Elmira, N.Y.

The gear wheel 70 is mounted on the shaft 24 for intermittent rotation therewith by means of a single revolution clutch generally referred to by the reference numeral 96 which may be of any suitable type such as a Model CB-260 Electric Clutch Brake manufactured by Electroid Corporation, of Union, N.Y., or a more simplified form of single revolution clutch such as a #2-1-64D clutch manufactured by the Hilliard Corporation, of Elmira, N.Y.

The single revolution clutch includes a first section 98 pinned to the shaft 24 as at 100 and a second section 102 on which the gear 70 is mounted. The gear 70 includes an abutment stop 104 operable to shift the actuator 106 of a double pole switch 108.

In operation, the drive of the shaft 26 from the shaft 24 normally is transmitted through the first drive connection 56 comprising the gear 58 and the gear 62 and therefore the shaft 26 is driven at a first speed somewhat slower than the speed of rotation of the shaft 24. During drive of the shaft 26 from the shaft 24 through the drive connection 56, the gear wheels 70 and 72 of the drive connection 68 remain stationary, the overrun clutch 86 defining a one-way connection between the gear wheel 72 and the shaft 26. Of course, when the single revolution clutch 96 is not actuated, there is no drive connection between the first and second sections 98 and 102 thereof and therefore the gear wheel 70 remains stationary during rotation of the shaft 24. However, when the single revolution clutch 96 is electrically actuated, for one revolution of the shaft 24 the shaft 26 will be driven from the shaft 24 through the drive connection 68 at a second higher speed. During this period the shaft 26 rotates ahead of the driven gear 62 and thus the abutment 82 advances faster than the abutment 84. In this manner, movement of the material 35 between the rollers 30 and 32 is speeded up. Then, after one complete revolution of the shaft 24 during its driving the shaft 26 through the drive connection 68, the single revolution clutch 96 is automatically deactivated and the shaft 26 is allowed to stop, due to inherent frictional resistance of the various bearings and contact of the resilient roller 30 with the material 35 and the roller 32, until such time as the abutment 84 "catches up" with the abutment 82 and drive of the drive shaft 26 from the shaft 24 is again resumed through the drive connection 56.

With attention now invited more specifically to FIGURE 3 of the drawings there may be seen a wiring diagram including a pair of main conductors 112 and 114, the conductor 112 being electrically connected to any suitable source of electrical potential and the conductor 114 being suitably grounded. The light source 42 is electrically connected to the conductor 112 in any convenient manner and is also suitable grounded. Further, the photoelectric cell assembly 44 is electrically connected to an actuating electromagnet 116 for a relay switch 118 electrically connected to the conductor 112 by means of a conductor 120. The relay switch includes a bridging member 122 actuated by the electromagnet 116 and which is operable to selectively bridge the conductor 120 with conductors 124 and 126, the conductor 124 including a terminal 128 and the conductor 126 being electrically connected to a relay switch actuating electromagnet 130. An additional conductor 132 is electrically connected to the conductor 112 at one end and to a terminal 134 at its other end, the terminals 128 and 134 comprising two terminals of a double relay switch 136 including a pair of bridging members 138 and 140 operable to selectively bridge the contacts 128 and 134 with conductors 142 and 144 whose ends remote from the bridging members 138 and 140 are connected to terminals 146 and 148 of the double relay switch 108 which includes bridging members 150 and 152 interconnected by means of the actuator 106. The bridging members 150 and 152 are operable to bridge the terminals 146 and 148 with terminals 154 and 156 carried by conductors 158 and 160, the conductor 158 being electrically connected to an actuating solenoid 162 for the single revolution clutch 96 and the conductor 160 being connected to the conductor 126.

The electromagnet 130 is grounded by conductor 164 and a conductor 166 has one end electrically connected to the conductor 112 and the other end connected to an actuating solenoid 168 for the cutter member 16, the solenoid 168 being grounded by a conductor 170 and the conductor 166 having a switch 172 disposed therein whose actuator 174 is engageable by the abutment stop 104 carried by the gear or gear wheel 70.

The bridging member 122 of the relay switch 118 is normally in the light on position illustrated in solid lines in FIGURE 3 of the drawings electrically bridging the conductors 120 and 124 and the shaft 24 drives the shaft 26 through the drive connection 56 at the slower speed of the shaft 26 and thus advances the material 35 toward the cutter member 16. Then, as one of the cards 40 is registered with the beam of light emanating from the light source 42, the photoelectric cell assembly 44 actuates the electromagnet 116 to shift the bridging member 122 to the light off or dotted line position illustrated in FIGURE 3 of the drawings whereupon the conductor 120 is electrically connected to the conductor 126 thereby actuating the electromagnet 130 to shift the bridging members 138 and 140 from the solid line positions thereof illustrated in FIGURE 3 of the drawings to the dotted line positons thereof so as to bridge the conductors 124 and 126 with the conductors 142 and 144. At this time, because the bridging member 152 is normally in the closed position illustrated in solid lines in FIGURE 3 of the drawings, the conductor 144 is electrically connected to the conductor 160 which is in turn connected to the electromagnet 130 and therefore the conductors 132, 144 and 160 define a holding circuit for the electromagnet 130. Of course, although the bridging member 150 is in the closed position electrically connecting the conductor 142 with the conductor 158, the clutch solenoid 162 is not electrically connected with the conductor 112 inasmuch as the bridging member 122 is in the dotted line position illustrated in FIGURE 3 of the drawings. Therefore, movement of the card 40 between the light source 42 and the photoelectric cell assembly 44 serves no purpose other than to actuate the electromagnet 130 so as to close the relay switch 136 and electrically connect the conductors 124 and 132 with the conductors 142 and 144. However, as soon as the card 40 moves from between the light source 42 and the photoelectric cell assembly 44 in the manner illustrated in FIGURE 1 of the drawings, the bridging member 122 shifts from the dotted line position thereof to the solid line position thereof electrically connecting the conductor 120 and the conductor 124. Therefore, the clutch solenoid 162 of the single revolution clutch 96 is actuated. This of course causes the shaft 24 to drive the shaft 26 through the drive connection 68 at a higher speed and as soon as the single revolution clutch 96 is actuated the abutment stop or cam 104 moves out of engagement with the actuator 106 thereby opening the relay switch 108 and interrupting the holding circuit for the solenoid 130. When the single revolution cycle is nearly complete, the abutment stop or cam 104 engages the actuator 174 of the switch 172 so as to electrically connect the conductor 166 with the solenoid 168 which starts the cutter member 16 for one stroke and therefore the cutter member 16 is moved into the opening 20 so as to cut the material 35 and is subsequently then withdrawn from the opening 20.

Of course, during the drive of the shaft 26 from the shaft 24 through the drive connection 68 at a higher rotational speed, the abutment 82 is advanced relative to the abutment 84 and thus upon termination of the operation of the single revolution clutch 96 after one complete revolution of the shaft 24 the drive connection 68 between the shafts 24 and 26 is terminated and the drive connection 56 between the shafts 24 and 26 is inoperative to cause rotation of the shaft 26 in response to rotation of the shaft 24 until such time as the abutment 84 catches up with the abutment 82. Accordingly, the shaft 26 is free to stop and it is just before this stopped period that the actuator 174 of the switch 172 is actuated for electrically actuating the die cutter starting solenoid. Accordingly, the cutter member 16 is advanced into the opening 20 and retracted therefrom during intermittent periods of stationary positioning of the material 35 during which the abutment 84 is catching up to the abutment 82.

The driving of the shaft 26 during a single revolution of the shaft 24 by the single revolution clutch 96 is sufficient to cause rotation of the shaft 26 in a manner which will automatically displace the trailing edge of the card 40 which has just passed out of registration with the light beam from the light source 42 past the cutting edge 22 of the cutter member 12. Accordingly, the feed mechanism of the instant invention may be seen to be operative to accurately position the material 35 for proper cutting by the cutter member 16 as soon as a light impervious portion of the material 35 passes the light beam from the light source 42.

As long as cards 40 not exceeding a predetermined length are utilized, the die cutter 10 may be as illustrated and include the opening 20 so that a complete card 40 may be punched from the material 35. However, if the cards 40 are of considerable length in the direction of movement of the material 35, the cutter member 14 may be eliminated so that the cutter member 16 merely acts as a simplified single cut member.

Of course, after the clutch and die cutter solenoids have been actuated, the abutment stop or cam 104 assumes its normal position illustrated in FIGURE 3 of the drawings and the bridging member 122 will remain in the solid line position thereof illustrated in FIGURE 3 of the drawings until such time as the next card 40 has its leading edge passed between the light source 42 and the photoelectric cell assembly 44 whereupon the procedure of actuating the holding circuit for the solenoid 130 will again be actuated.

It will be of course understood that the drive mechanism of the instant invention may be utilized on conventional conveyor drive mechanisms and that the relay switch 118 may be actuated in any suitable manner other than the light source 42 and photoelectric cell assembly 44 such as by a feeler member actuated switch adapted to sense articles disposed on such a conveyor. Further, if it is desired, the single revolution clutch 96 may be of the type incorporating therein a braking mechanism for automatically braking the shaft 26 through the gears 70 and 72 as soon as the single revolution clutch 96 has completed driving the shaft 26 through one complete revolution of the shaft 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An intermittent drive feed mechanism including a rotatable output shaft and a rotatable input shaft, first drive means drivingly connecting said input shaft to said output shaft for proportional rotation of the latter relative to the said input shaft, at a first predetermined drive ratio, second intermittently actuatable drive means drivingly connecting said input shaft to said output shaft for proportional rotation of the latter relative to said input shaft at a second numerically lower drive ratio, said first drive means including overrun means allowing faster rotation of said output shaft than that rotation which would be afforded by said first drive means, said second drive means including normally released clutch means actuatable to intermittently establish a driving connection between said input shaft and said output shaft.

2. The combination of claim 1 wherein said clutch means comprises a clutch, when actuated, operable to maintain the driving connection between said input shaft and output shaft for a given number of degrees of rotation of said input shaft and thus automatically declutch said input shaft from driving connection with said output shaft.

3. The combination of claim 2 wherein said overrun means includes means operative to allow said output shaft to overrun a predetermined number of degrees of rotation of said output shaft and to thereafter, after declutching said drive shaft from said input shaft through said second drive means, to pick up the drive of said output shaft from said input shaft automatically after said drive shaft has rotated an amount which would normally drive said output shaft an amount equal to said predetermined overrun of said output shaft thereby allowing said output shaft to be stopped during constant rotation of said input shaft and the time interval between termination of the predetermined overrun of said output shaft and the subsequent pick-up of the drive of said output shaft by said first drive means.

4. The combination of claim 3 including a conveyor assembly of which said output shaft comprises a drive member therefor, whereby material advanced by said conveyor assembly may be intermittently stopped for processing at predetermined intervals during constant rotation of said input shaft.

5. The combination of claim 4 wherein said clutch means incluudes actuating means adapted to sense predetermined articles on said conveyor assembly moving thereby and operable to actuate said clutch means upon sensing said articles.

6. The combination of claim 5 wherein said actuator means includes a photoelectric cell assembly adapted to sense the interruption of a beam of light by an article being moved by said conveyor assembly therethrough.

7. An intermittent drive feed mechanism incluuding an input member and an output member, transmission means drivingly connecting said input member to said output member through two separate selectively usable power transmission paths, said transmission means including selectively actuatable power transmission shift means operative, when actuated, to shift the path of transmission of power from a first of said paths to the second for a predetermined period and then automatically back to the first path.

8. The combination of claim 7 wherein said power transmission shift means, when shifting the transfer of power from said second path to said first path, includes means operative to automatically momentarily disconnect said input member from all driving connection with said output member after driving said output member through said second path for said predetermined period before resuming transmission of power to said output member through said first path whereby said output member may be braked prior to the transmission of power thereto through said first path is resumed.

9. The combination of claim 7 wherein said second path of power transmission includes means operable to drive said output member at a greater rate than said first path, and said power transmission shift means includes means operative, upon actuation of said shift means, to shift the transmission of power to said output member from said first path to said second path and then disconnect said input member from all driving connection with said output member for said predetermined period before resuming the transfer of power from said input member to said output member through said first path to resume driving said output member from said input member through said first path at the precise point of movement of said output member the latter would be in if said output member had been continuously driven from said input member through said first path.

References Cited

UNITED STATES PATENTS 3,119,282   12/1964   Raze _____ 74—682

RICHARD E. AEGERTER, *Primary Examiner*.